United States Patent

Stuemky

[15] 3,677,109
[45] July 18, 1972

[54] CONTINUOUSLY VARIABLE FRICTION GEAR

[72] Inventor: Robert E. Stuemky, Denver, Colo.
[73] Assignee: The Gates Rubber Company, Denver, Colo.
[22] Filed: Jan. 14, 1971
[21] Appl. No.: 106,464

[52] U.S. Cl. ................................... 74/796, 74/208, 74/467
[51] Int. Cl. ................. F16h 15/50, F16h 13/14, F16h 57/04
[58] Field of Search ............................................. 74/796, 467

[56] References Cited

UNITED STATES PATENTS

| 2,342,071 | 2/1944 | Bade ........................................ 74/746 |
| 2,292,066 | 8/1942 | Erban ................................... 74/796 X |
| 2,706,916 | 4/1955 | Graham .................................... 74/796 |
| 2,238,801 | 4/1941 | Schmitter .............................. 74/796 |
| 1,299,156 | 4/1919 | Fast ..................................... 74/467 X |
| 2,240,148 | 4/1941 | Schmitter et al ..................... 74/796 |
| 2,328,536 | 9/1943 | Bade .......................................... 74/796 |
| 2,343,840 | 3/1944 | Bade .......................................... 74/796 |
| 2,457,431 | 12/1948 | Bade .......................................... 74/796 |
| 3,504,574 | 4/1970 | Okabe ..................................... 74/796 |

Primary Examiner—Carlton R. Croyle
Assistant Examiner—Thomas C. Perry
Attorney—Raymond Fink, H. W. Oberg, Jr. and Curtis H. Castleman, Jr.

[57] ABSTRACT

A continuously variable friction gear of the planetary type having a plurality of double cone rollers so arranged that the top cone surface of each roller contacts an imaginary cylindrical surface. The rollers are epicyclically driven by a driver shaft. An internal rim wheel engages the bottom cone surface of each roller and connects to a driven shaft. The gear is shifted between forward and reverse by a non-rotating shifting ring which engages the cylindrically aligned surface of the rollers.

10 Claims, 4 Drawing Figures

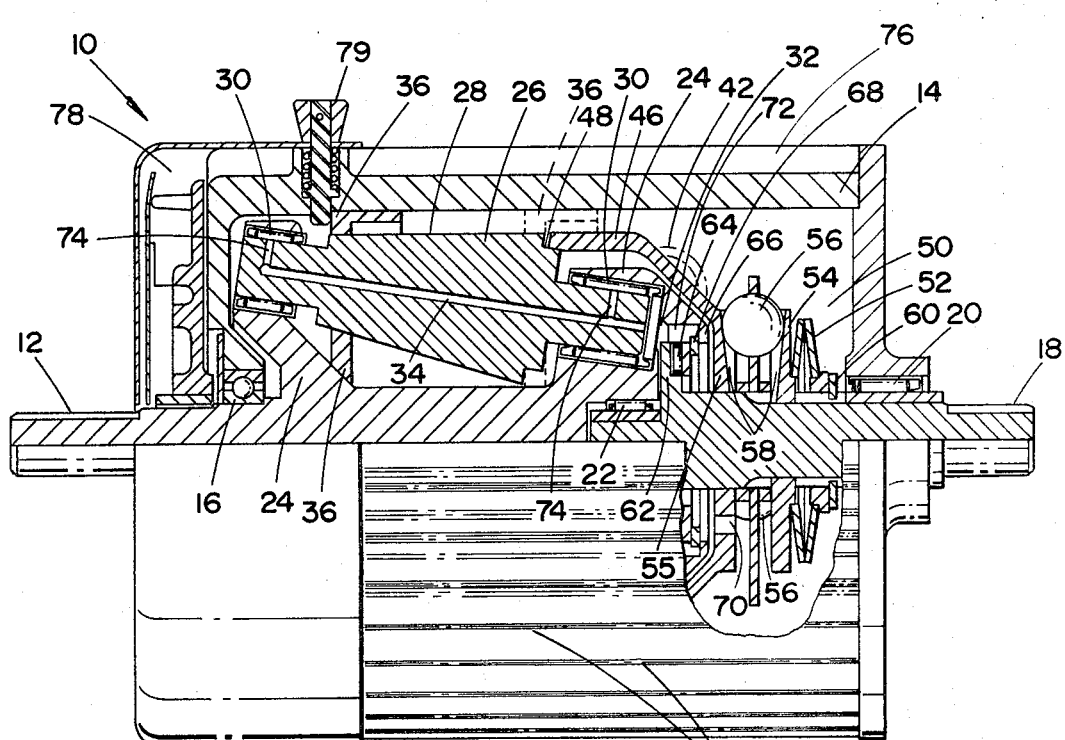
FIG. 1
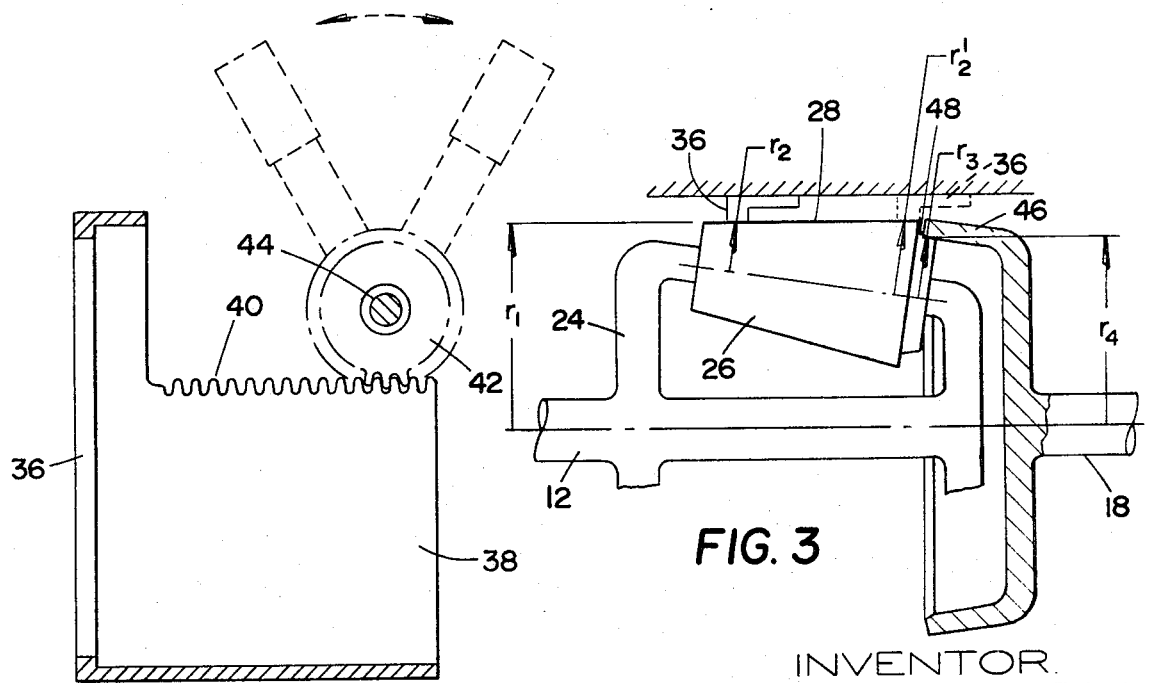
FIG. 2
FIG. 3
INVENTOR.
ROBERT E. STUEMKY
BY H. H. Oberg Jr
ATTORNEY INVENTOR
ROBERT E. STUEMKY
BY H H Oberg Jr
ATTORNEY 3,677,109

CONTINUOUSLY VARIABLE FRICTION GEAR

BACKGROUND OF THE INVENTION

The invention relates to machine elements and mechanisms but more particularly, the invention relates to continuously variable friction gearing of the planetary type. For the purpose of this specification, the term "double cone roller" refers to a roller having upper and lower truncated cones arranged with their respective apexes toward opposite ends of the roller.

Various types of continuously variable friction gears having a plurality of cone rollers arranged so the cone surface of each roller contacts an imaginary cylindrical surface, are known in the art. Examples of such gears are disclosed in the following U.S. Pat. Nos.: 1,887,505; 2,062,901; 2,126,508; 2,178,395; 2,222,557; 2,574,530; 2,836,994; 3,023,642; 3,023,643; 3,108,496 and 3,108,497. Difficulties associated with the prior art include complex construction, indeterminate pressure contact between traction surfaces, reversibility, complicated shifting mechanisms and size in relation to power transmission capability.

SUMMARY OF THE INVENTION

In accordance with the invention, there is provided an infinitely variable friction gear of the reversible type. The gear includes a driver shaft axially aligned with a driven shaft; a carrier member connected to said driven shaft and mounting a plurality of double cone rollers arranged so that the top cone surface of each roller contacts an imaginary cylinder concentric with the driver shaft; a shifting ring engaging and movable along the top cone surface of each double cone roller; means for shifting the shifting ring; a rim wheel mounted to the driven shaft and engaging the bottom cone surface of each double cone roller; and means for increasing the pressure contact between the double cone rollers, the shifting ring and the rim wheel.

It is the object of the invention to provide a continuously variable gear of the double cone roller type which is reversible.

Another object of the invention is to provide a compact speed change gear of the double cone roller type which is capable of transmitting high horsepower and torque.

Still another object of the invention is to provide a friction gear having torque responsive means for increasing the contact pressure of the friction surfaces without substantially inducing secondary loads to the supports for the driver and driven shafts.

Yet another object of the invention is to provide a means for pulling together the driver and driven shafts in a converging manner to increase the pressure contact of the power transmitting or tractive surfaces.

Another object of the invention is to provide a pumping means responsive to rotation of the driven shaft for pumping lubricant to the bearings of the double cone rollers.

These and other objects and advantages of the invention will become more apparent upon review of the drawings and description thereof wherein:

FIG. 1 is a partial sectional view along the longitudinal axis of the invention.

FIG. 2 is a sectional view of the shifting mechanism of FIG. 1.

FIG. 3 is a schematic showing the gear train of the invention.

DESCRIPTION OF PREFERRED EMBODIMENT

Figure 4:
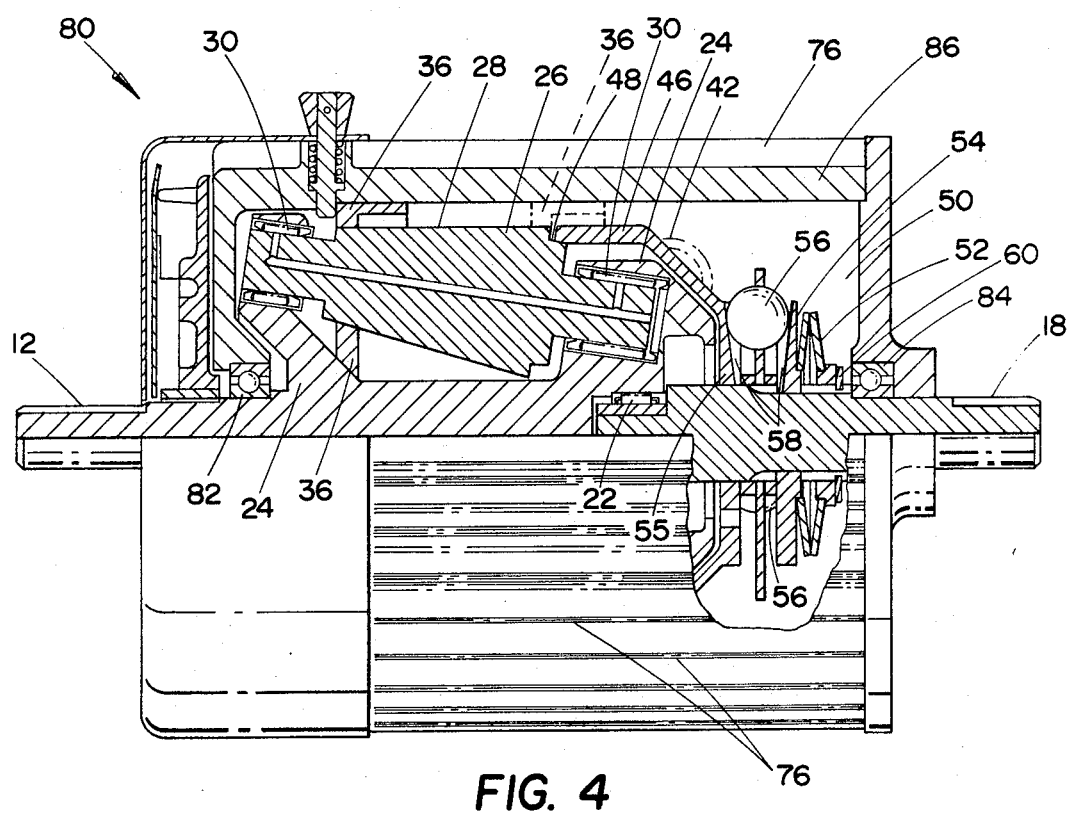
FIG. 4 is a view similar to FIG. 1 but showing another embodiment of the invention.

Referring to FIGS. 1 and 2, a continuously variable speed change gear 10 of the friction type is provided. A driver shaft 12 extends through a housing 14 and is supported by a bearing 16. A driven shaft 18 axially aligned with the driver shaft, extends through the opposite end of the housing and is supported by a bearing 20. A pilot bearing 22 is positioned between the shafts to facilitate axial alignment. A carrier member 24 is mounted to the driver shaft 12. The carrier member 24 may be an integral part of the driver shaft or separately attached thereto. The carrier member 24 mounts a plurality of double cone rollers 26 that are arranged so the radially outer top cone surface 28 of each double cone roller contacts an imaginary cylindrical surface. Each double cone roller 28 is supported by bearings 30. Passageways 32 in the carrier extend to and communicate with a passageway 34 in each roller for the purpose of providing lubricant to the bearings 30 in a manner which will be later explained. A grounded shifting ring 36 engages the top cone surface 28 of each double cone roller. The shifting ring 36 is operated by reciprocally moving it along the top cone surface 28 of each double cone roller 26. An extension 38 of the shifting ring 36 is shaped as a cylinder having a chordal portion removed therefrom. Rack type gear teeth 40 are formed along the longitudinal edge of the extension 38 and mesh with a pinion gear 42. A shaft 44 extends through the housing 14 and mounts the pinion. Rotation of the shaft 44 operates the mechanism to reciprocate the shifting ring 36 along the top cone surfaces 28 and effect a speed change of the gear 10 in a manner which will later be described.

An internal rim wheel 46 engages the radially outer bottom cone surface 48 of each double cone roller 26. The rim wheel 46 is concentric with and mounted to reciprocate along the driven shaft 18. A cam and ball device 50 in series with a spring 52, operates to move the rim wheel 46 into the bottom cone surfaces 48 and increase the normal pressure contact therebetween. Because of the inclined plane of the bottom cone surface 48 and the rim wheel 46, a component force is induced into each double cone roller 26 to move them longitudinally toward the shifting ring 36. The longitudinal movement promotes a wedging action between the top cone surfaces 28 and the shifting ring 36 for increased pressure contact. Additionally, centrifugal force moves the rollers 26 along their longitudinal axes causing pressure contact between the top cone surfaces 28 and the shifting ring 36.

The purpose of the cam and ball device 50 is to vary contact pressure between the shifting ring 36, double cone rollers 26 and rim wheel 46. As torque loads to the gear 10 increase, contact pressure between the tractive surfaces of the gear is increased to preclude slipping. One cam element 54 is keyed or splined to the driven shaft and a second cam element 55 is formed on the rim wheel. When the driven shaft rotates, the balls 56 of the device 50 advance between the cam surfaces 58 to increase pressure contact between the tractive surfaces. The balls 56 also lock the rim wheel 46 to the driven shaft 18.

The spring 52 is biased in series between the cam and ball device 50, and the driven shaft 18. One end of the spring is retained to the driven shaft 18 by means of a retaining ring 60 or collar. The other end of the spring seats against the keyed cam element 54. The spring 52 is pre-loaded to hold the rim wheel 46 in slight pressure contact with the bottom cone surface 48 of each double cone roller 26.

A collar 62 extends from the driven shaft 18 and aligns a thrust bearing 64. A second collar 66 extends from the driver shaft 12 or carrier and overlaps the collar 62 of the driven shaft. A retaining ring 68 locks the overlapping collars together holding the thrust bearing in place. The two collars 62, 66 and the thrust bearing 64 provide means for drawing or pulling the collars 62 and 66 together in a converging manner as the cam and ball device 50 is actuated.

Advancement of the balls 56 between the cam surfaces 58 further compresses the bias spring 52 which results in the rim wheel 46 being moved into increased pressure with the bottom cone surface 48. As previously explained, the double cone rollers 26 are wedged into the shifting ring 36 to increase the contact pressure of the tractive surfaces. Simultaneously, the driver 12 and driven 18 shafts are pulled together because of the overlapping collars 62, 66. The degree to which the shafts 12, 18 are converged depends on how far the balls 56 have advanced along the cam surfaces 58. The driver and driven shafts are coupled together in a converging manner to preclude translation loads as induced by the cam and ball device 50 from being transmitted to the housing. The overlapping collar construction of the driver and driven shafts is preferred because in many power transmission applications it precludes using expensive thrust bearings at each end of the housing 14. However, when the center thrust bearing is eliminated, thrust bearings are mounted on the shafts at each end of the housing 14 in a manner which will later be explained, to balance longitudinal forces induced by the cam and ball device 50.

The operation of the gear is epicyclic. When the driver shaft 12 is rotated, the driven shaft 18 may rotate in the same direction, rotate in the opposite direction or not rotate at all. The direction in which the driven shaft 18 rotates depends on the position of the shifting ring 36 in relation to the top cone surfaces 18. When the shifting ring 36 is in the position shown, the driven shaft 18 rotates in a reverse direction from the driver shaft. When the shifting ring is moved to the position shown by the dotted line, both shafts 12, 18 operate in the same direction.

The epicyclic operation of the gear is best understood in reference to FIG. 3. As the carrier 24 is rotated clockwise by the driver shaft 12, the double cone rollers 26 are rotated counter clockwise as they roll along the grounded shifting ring 36. The double cone rollers transmit motion to the rim wheel 46 through the bottom cone surfaces 48. Thus, it is seen that two components of motion are transmitted to the rim wheel 46; the clockwise motion of the driver shaft 12; and the counter clockwise motion of the double cone rollers 26. The rotational speed of the double cone rollers 26 is adjustable. The double cone rollers 26 rotate counter clockwise very fast when the shifting ring 36 is toward the small diameter of the upper cone surface, whereas the rollers rotate much more slowly when the shifting ring 36 is toward the large diameter of the top cone surfaces 28, as shown in dotted form. The counter clockwise rotation of the double cone rollers 26 predominates over the clockwise rotation of the driver shaft when the rollers rotate very fast, and thus, the driven shaft is rotated in reverse. Should the counter clockwise motion induced by the rollers 26 just equal the clockwise rotation of the driver shaft 12, the driven shaft 18 will not rotate. As the counter clockwise rotational speed of the rollers is further reduced, the clockwise rotation of the driver shaft 12 predominates and the driven shaft 18 is rotated clockwise. Mathematically, the foregoing relationship may be expressed as follows:

Considering the whole mechanism locked and given one positive or clockwise revolution of the driver shaft 12 or carrier 24, each member rotates +1 revolution. Next consider that the carrier 24 is fixed and the shifting ring 36 is given one revolution in the negative or counter clockwise direction. The motions in the second case are: −1 revolution for the shifting ring 36; $-r_1/r_2$ revolutions for the rollers 26; $-r_1/r_2 \times r_3/r_4$ revolutions for the rim wheel 46 or driven shaft. The total motion is then given by the following table:

| | shifting ring | rollers | carrier | rim wheel |
|---|---|---|---|---|
| motions with shifting ring | +1 | +1 | +1 | +1 |
| motions relative to shifting ring | −1 | $-r_1/r_2$ | 0 | $-r_1r_3/r_2r_4$ |
| total motions | 0 | $1-r_1/r_2$ | +1 | $1-r_1r_3/r_2r_4$ |

The motion between the carrier and the rim wheel, and consequently the driver and driven shaft, is:
$$1 - (r_1r_3/r_2r_4)/1$$
If the relationship $r_1r_3/r_2r_4$ is less than 1, the motion is positive (clockwise). If the relationship is greater than 1, the motion if negative (counter clockwise).

It is seen that $r_1$ approximately equals $r_4$. Then, the approximate motion between the driver 12 and the driven 18 shafts is:

$$1 - (r_3/r_2)/1$$

Now it is easily understood than when $r_2$ is less than $r_3$, the motion of the driven shaft is negative or counter clockwise. When $r_2$ about equals $r_3$, the output motion is zero. And when $r_2$ is larger than $r_3$ (e.g. $r'_2$), the driven shaft motion is positive or clockwise. Thus, the gear is fully reversible.

ADDITIONAL SPECIES

As horsepower requirements of the gear 10 increase, it is desirable to include a pumping means to supply lubricant to the bearings 30 of the double cone rollers 26. Spaced apart openings 70 are provided in the rim wheel circumjacent to the balls 56 of the ball and cam device. The openings 70 are radially inward of and adjacent to the overlapping collar 66 of the driven shaft. An annular groove 72 is formed in the carrier 24 next to the collar 66 and near the axis of each double cone roller 26. The longitudinal passageway 34 is formed in each double cone roller. Radial passageways 74 extend from the bearings 30 of the double cone rollers to the longitudinal passageways 34. When the gear 10 is operated, free lubricant in the housing is splashed through the openings 70 in the rim wheel 46 and collected in the annular groove 72 of the carrier. In the collection process, the thrust bearing 64 between the driver and driven shaft is lubricated. From the annular groove 72, lubricant is centrifugally pumped up the longitudinal passageways 34 and into the radial passageways 74 to feed the bearings 30 of each double cone roller.

As horsepower transmitting requirements of the gear are further increased and the size of the gear remains the same, it is desirable to provide a cooling means to maintain acceptable lubricant temperatures under sustained operating conditions. To this end, longitudinal fins 76 are formed on the exterior of the housing 14 and a shrouded fan 78 is mounted to the driver shaft 12. When the driver shaft is rotated, air is blown past the fins 76 to dissipate heat therefrom. As heat is dissipated by the fins, the lubricant in the housing is maintained within tolerable limits.

As explained previously, the shifting ring 36 may be adjusted to a point on the top cone surface 28 of each double cone roller so there is no rotation of the driven shaft 18. However, when the zero rotation is achieved, the double cone rollers 26 are rotating. In some applications where the gear is directly coupled to a power means not having a clutch, it is advantageous to disengage the rollers 26 from the shifting ring 36 to achieve clutching. A spring loaded stop 79 is provided to prevent the shifting ring from being positioned past the end of the rollers during normal operation. When the stop 79 is displaced, the rollers 26 may be disengaged by positioning the shifting ring 36 past the end of each double cone roller 26.

In some power transmission applications, it is desirable to support the driven shaft with a bearing capable of handling secondary loads which may be externally induced to the shaft. In such a situation, it may be economically advantageous to eliminate the center thrust bearing 64 of FIG. 1 and replace the light duty bearing 20 with a heavy duty thrust bearing. Referring now to FIG. 4, a speed change gear 80 without a thrust bearing between the driver 12 and driven 18 shafts is shown. The same reference numerals are used to identify the same component parts of FIGS. 1 and 4. Heavy duty thrust bearings 82, 84 are mounted at each end of the housing 86 to support the driver 12 and driven 18 shafts and balance longitudinal forces generated by the ball and cam device 50. The epicyclic operation of the gear 80 is the same as previously explained for the gear 10 of FIG. 1. Operation of the ball and cam device to increase the contact pressure between the tractive surfaces of the gear is also the same. However, as the balls 56 of the device 50 advance between the cam surfaces 58, the bias spring 52 is compressed against the ring 60 generating longitudinal forces that tend to move the driven shaft 18 away from the driver shaft 12. The shafts 12, 18 are restrained from moving apart by the thrust bearings 82, 84.

The foregoing detailed description was made for purpose of illustration only and is not intended to limit the scope of the invention which is to be determined from the appended claims.

What is claimed is:

1. A continuously variable friction gear of the planetary type comprising:
   a driver shaft;
   a driven shaft arranged coaxially with said driver shaft;
   a carrier member mounted to said driver shaft;
   a plurality of double cone rollers, each rotatably supported and free to move axially a predetermined amount, said rollers mounted to said carrier member, the radially outer top cone surface of each cone roller arranged to contact an imaginary common cylindrical surface concentric with the axis of said driver shaft;
   a grounded shifting ring engaging a portion of the top cone outer surface of each double cone roller;
   operating means for moving said shifting ring reciprocally along the top cone outer surface of each double cone roller;
   an internal rim wheel engaging the radially outer bottom cone surface of each double cone roller, said rim wheel concentric with and mounted to said driven shaft; and
   means for urging said rim wheel into pressure contact with the bottom cone surface of each double cone roller, and urging said rollers axially to place the top cone surface of each double cone roller into pressure contact with said shifting ring.

2. A friction gear as set forth in claim 1 wherein said urging means includes a cam and ball device between said driven shaft and said rim wheel.

3. A friction gear as set forth in claim 1 and further including:
   a collar extending from the driver shaft and a collar extending from the driven shaft, said collars in overlapping relation with each other;
   bearing means sandwiched between the overlapping collars; and
   means for pulling the collars together in a converging manner when said urging means is operated.

4. A friction gear as set forth in claim 1 and further including lubrication pumping means responsive to rotation of said driver shaft for pumping a lubricant to the mountings of said double cone rollers.

5. A friction gear as set forth in claim 1 and further including means for disengaging said shifting ring from said double cone rollers.

6. A continuously variable gear of the friction type having:
   a driver shaft;
   a driven shaft aligned axially with said driver shaft;
   a plurality of cone rollers so arranged that the cone surface of each cone roller contacts an imaginary cylinder;
   means for operatively connecting the rollers between the driver and driven shafts; and
   means for increasing pressure contact between the rollers and the operating means; wherein the improvement comprises:
   a collar extending from the driver shaft and a collar extending from the driven shaft, said collars overlapping each other;
   bearing means sandwiched between the overlapping collars; and
   means for pulling the collars together in a converging manner when the pressure contact means is operated.

7. A continuously variable friction transmission of the planetary type comprising:
   a housing;
   a driver shaft extending into and rotatably mounted to said housing;
   a driven shaft extending into and rotatably mounted to said housing, said driven shaft arranged coaxially with said driver shaft;
   a friction gear disposed within said housing comprising:
     a carrier member mounted to said driver shaft;
     a plurality of double cone rollers, each rotatably supported and free to move axially a predetermined amount, said rollers mounted to said carrier member, the radially outer top cone outer surface of each cone roller arranged to contact an imaginary common cylindrical surface concentric with the axis of said driver shaft;
     a grounded shifting ring engaging a portion of the top cone outer surface of each double cone roller;
     operating means for moving said shifting ring reciprocally along the top cone outer surface of each double cone roller; and
     an internal rim wheel engaging the radially outer bottom cone outer surface of each double cone roller, said rim wheel concentric with and mounted to said driven shaft; and
   means for urging said rim wheel into pressure contact with the bottom cone surface of each double cone roller, and urging said rollers axially to place the top cone surface of each double cone roller into pressure contact with said ring.

8. A friction gear as set forth in claim 7 and further including:
   a collar extending from the driver shaft and a collar extending from the driven shaft, said collars in overlapping relation with each other;
   bearing means sandwiched between the overlapping collars; and
   means for pulling the collars together in a converging manner when said urging means is operated.

9. A transmission as set forth in claim 7 and further including means for cooling said housing.

10. A transmission as set forth in claim 7 which further includes lubrication pumping means responsive to rotation of said driver shaft for pumping a lubricant to the mountings of said double cone rollers.

* * * * *